United States Patent
Ryu et al.

(10) Patent No.: US 7,162,295 B2
(45) Date of Patent: Jan. 9, 2007

(54) APPARATUS AND METHOD FOR RECOGNIZING POSITIVE/NEGATIVE INTENTION USING FINE CHANGE OF GAMMA WAVE OF BRAINWAVE

(75) Inventors: Chang Su Ryu, Daejeon-Shi (KR); Yoon Seon Song, Daejeon-Shi (JP); Seung Hoon Nam, Daejeon-Shi (KR); Tae Gyu Yim, Daejeon-Shi (KR); Chang Yong Ryu, Daejeon-Shi (KR)

(73) Assignee: Electronics and Telecommunications Research Institute, Daejeon-shi (KR)

( * ) Notice: Subject to any disclaimer, the term of this patent is extended or adjusted under 35 U.S.C. 154(b) by 346 days.

(21) Appl. No.: 10/800,763

(22) Filed: Mar. 16, 2004

(65) Prior Publication Data

US 2005/0137493 A1    Jun. 23, 2005

(30) Foreign Application Priority Data

Dec. 22, 2003    (KR) .................... 10-2003-0095037

(51) Int. Cl.
   *A61B 5/04*    (2006.01)
(52) U.S. Cl. ...................... 600/544; 600/545
(58) Field of Classification Search ............... 600/544, 600/545
   See application file for complete search history.

(56) References Cited

U.S. PATENT DOCUMENTS

| 5,601,090 | A | 2/1997 | Musha |
| 5,638,826 | A | 6/1997 | Wolpaw et al. |
| 5,649,061 | A | 7/1997 | Smyth |
| 5,692,517 | A | * 12/1997 | Junker .................. 600/545 |
| 5,840,040 | A | 11/1998 | Altschuler et al. |
| 6,175,762 | B1 | 1/2001 | Kirkup et al. |
| 6,396,438 | B1 | 5/2002 | Seal |
| 6,407,665 | B1 | 6/2002 | Maloney |
| 6,615,076 | B1 * | 9/2003 | Mitra et al. ............... 600/544 |

FOREIGN PATENT DOCUMENTS

| KR | 2001-57875 | 7/2001 |
| KR | 1020010057875 | 7/2001 |
| KR | 2003-16921 | 3/2003 |

OTHER PUBLICATIONS

Zachary A. Keirn, et al.; "*A New Mode of Communication Between Man and His Surroundings*"; IEEE Transactions on Biomedical Engineering; vol. 37, No. 12; Dec. 1990; pp. 1209-1214.

* cited by examiner

*Primary Examiner*—Charles A Marmor, II
*Assistant Examiner*—Zoe E Baxter
(74) *Attorney, Agent, or Firm*—Mayer Brown Rowe & Maw LLP

(57) ABSTRACT

Provided are an apparatus and a method for recognizing positive/negative intention using a fine change of gamma wave of a brainwave comprising the steps of detecting the brainwave from a head of a user, receiving and amplifying the brainwave detected from the step of detecting the brainwave, converting the amplified analog brainwave to one of a digital type, and recognizing the positive/negative intention of the user by detecting the fine change of the gamma wave of the brainwave in the digital type, which is transmitted from the A/D converting portion, whereby it is possible to implement an application of a real time interface and minimizes inconvenience for the user, and it requires no separate user practice.

22 Claims, 2 Drawing Sheets

APPARATUS AND METHOD FOR RECOGNIZING POSITIVE/NEGATIVE INTENTION USING FINE CHANGE OF GAMMA WAVE OF BRAINWAVE

BACKGROUND

1. Field of the Invention

The present invention relates to a brain-computer interface technology. In particular, the present invention relates to an apparatus and a method for recognizing positive/negative intention using a fine change of gamma wave of a brainwave to enable recognition of the positive/negative intention without using hands or voices, by detecting the fine change of the gamma wave of the brainwave generated when determining the positive/negative intention without guiding a specific brainwave that can be easily discriminated.

2. Discussion of Related Art

A brainwave, which is a means for grasping the brain activity in a space-time fashion, is a representative biological signal so that it has been widely used in clinical and brain functional researches. In recent years, the brainwave is utilized in biofeedback for improving a mental state of users through modulation of the brainwave by means of an external stimulus, a brainwave application becomes enlarged into a brain-computer interface (BCI) field, where human beings interface with machine through the brainwave without having any languages or body movement employed.

The brain-computer interface technology in accordance with the related art has required intended practice from the users so as to have a specific brainwave such as a discriminate α-wave appeared in purpose or to have an asymmetric brainwave appeared between left/right hemisphere in purpose, which causes inconvenience due to a mismatch between the intention (e.g., trying to turn off the switch) and the action (e.g., closing eyes to amplify the α-wave) of the users, so that it can not be regarded as true intention recognition through the brainwave.

U.S. Pat. No. 5,840,040, entitled "Encephalolexianalyzer" to Eric L., Altschuler and Farid U. Dowla, issued in 1998, discloses a technique using mu wave as Morse code, which is changed when thinking about an action or performing the action, and U.S. Pat. No. 6,175,762, entitled "EEG based activation system" to Leslie Kirkup et al, issued in 2001, discloses a technique that performs turning on/off switch by using α-wave amplified when closing eyes, however, in these related arts, intentional actions should also be taken to implement the intention of the user, which causes inconvenience to the user.

Other U.S. Pat. No. 5,601,090, entitled "method and apparatus for automatically determining somatic state" to Toshimitsu Musha, issued in 1997, discloses a technique that analyses brainwave data of several seconds and affixes several electrodes over the head to determine the somatic state of the user, and another U.S. Pat. No. 5,649,061 entitled "device and method for estimating a mental decision" to Christopher C. Smyth, issued in 1997, discloses a technique that employs biological signals other than the brainwave. These related arts, however, cause inconvenience to users when applied and have a difficulty in a real-time application.

SUMMARY OF THE INVENTION

Therefore, the present invention is contrived to solve the aforementioned problems. The present invention is directed to an apparatus and a method for recognizing positive/negative intention using a fine change of gamma wave of a brainwave, which can deliver natural intention through the brainwave by recognizing the positive/negative intention (Yes/No) of the user through the brainwave without having a specific brainwave appeared with the aid of separate user practice, implement an application of a real time interface by utilizing the brainwave data of 5 seconds or less, and minimize inconvenience for the user when the user puts on a brainwave detector, by measuring the brainwave with one electrode positioned above a left frontal area of the brain.

One aspect of the present invention is to provide an apparatus for recognizing positive/negative intention using a fine change of gamma wave of a brainwave, comprising: a brainwave detecting portion for detecting the brainwave from a head of a user; a brainwave amplifying portion for amplifying the brainwave detected from the brainwave detecting portion; an A/D converting portion for converting the amplified brainwave received from the brainwave amplifying portion to one of a digital type; and a recognizer for recognizing the positive/negative intention of the user by detecting the fine change of the gamma wave of the brainwave in the digital type, which is transmitted from the A/D converting portion.

In a preferred embodiment of the present invention, a control portion for generating control commands to a peripheral output device in response to the positive/negative intention recognized in the recognizer is further comprised.

Here, the brainwave detecting portion has an electrode at a left frontal area of the user.

Another aspect of the present invention is to provide a method for recognizing positive/negative intention using a fine change of gamma wave of a brainwave, comprising: a step of detecting a brainwave from a head of a user; a step of receiving and amplifying the brainwave detected from the step of detecting the brainwave; a step of converting the amplified analog brainwave to one of a digital type; and a step of recognizing the positive/negative intention of the user by detecting the fine change of the gamma wave of the brainwave in the digital type, which is transmitted from the A/D converting portion.

In a preferred embodiment of the present invention, a step of controlling for generating control commands to a peripheral output device in response to the positive/negative intention recognized in the step of recognizing the positive/negative intention is further comprised.

Here, the recognition of the positive/negative intention in the recognition step is performed such that the fine change of an output of each frequency within a gamma wave band is sensed. And, the gamma wave band is in the range of 32 Hz to 40 Hz.

Further, the recognition step includes the steps of receiving the brainwave of the digital type, calculating the fine change of frequency components included in the gamma wave band from the brainwave of the digital type; and determining positive/negative and presence/absence of the intention in response to the fine change. Here, the fine change of the frequency components is calculated to be [P(first frequency)−P(second frequency)]/[P(first frequency)+P(second frequency)] or P(first frequency)/[P(first frequency)+P(second frequency)], and the first and the second frequencies are ones of the gamma wave band. In addition, the determination step includes the steps of determining that the intention is present when two peaks higher than a first predetermined threshold value are present in the fine change of the gamma wave, and that the intention is not present when the two peaks are not present, and determining the positive/negative intention by comparing a second predetermined threshold value with a distance between the two peaks.

DETAILED DESCRIPTION OF PREFERRED EMBODIMENTS

Hereinafter, embodiments of the present invention will be described with reference to accompanying drawings. This invention may, however, be embodied in different forms and should not be constructed as limited to the embodiments set forth herein. Rather, these embodiments are provided so that this disclosure will be thorough and complete, and will fully convey the scope of the invention to those skilled in the art.

Figure 1:
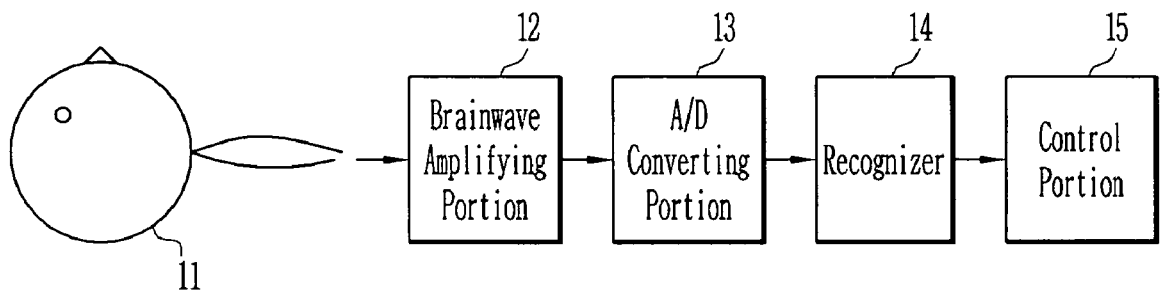
FIG. 1 shows a schematic view of an apparatus for recognizing positive/negative intention in accordance with a preferred embodiment of the present invention.

FIG. 1 shows a schematic view of an apparatus for recognizing positive/negative intention in accordance with a preferred embodiment of the present invention. In FIG. 1, the apparatus for recognizing the positive/negative intention comprises a brainwave detecting portion 11, a brainwave amplifying portion 12, an A/D converting portion 13, a recognizer 14, and a control portion 15.

The brainwave is detected by the brainwave detecting portion 11, and an arrangement of an electrode for detecting the brainwave is typically based on F3 of 10–20 international nomenclature, however, the arrangement can be adjusted within the left frontal area.

A signal detected from the brainwave detecting portion 11 is amplified by the brainwave amplifying portion 12 for amplifying the signal and is subjected to filtering for 60 Hz alternative current, which is typically performed when the brainwave is measured.

The amplified brainwave is converted from an analog type to a digital type using the A/D converting portion 13. In particular, a 30 Hz low-pass filter is not employed, which is usually used in a clinical research for extracting gamma wave (30 Hz or more) related to higher cognitive process.

The recognizer 14 recognizes the positive/negative intention of the user by sensing a fine change of gamma wave of the brainwave that is appeared when the positive/negative intention is determined.

The control portion 15 generates activation commands to peripheral output devices (e.g., monitor or input device for other machines) depending on the positive/negative intention.

Figure 2:
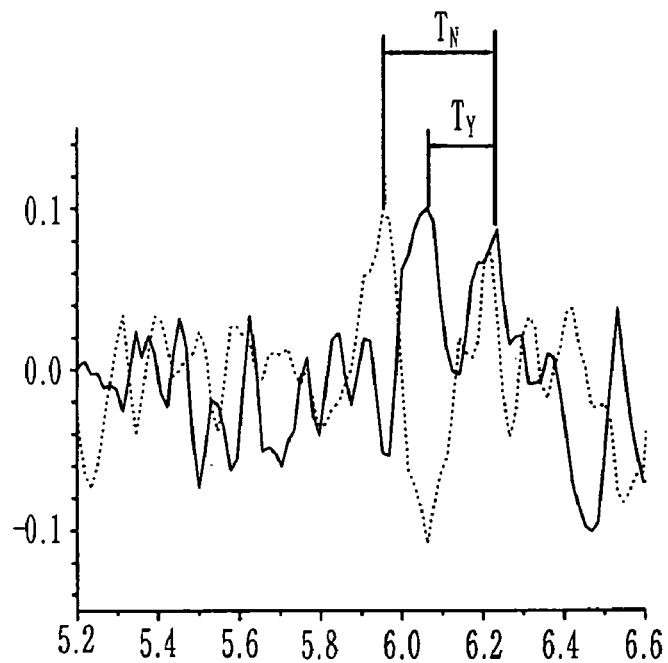
FIG. 2 shows a graph representing a fine change of gamma wave measured in a recognizing portion.

FIG. 2 shows a graph representing a fine change of gamma wave measured in the recognizer 14. In FIG. 2, fine changes have been obtained per 31.25 ms using an overlap of 91.7% and a time window of 0.1875 seconds. In this case, the size of the horizontal time window and the overlap may be adjusted in accordance with property of the brainwave of the user. Two facts can be obtained from FIG. 2, first one is that two peaks appear in the fine changes of gamma wave when the user determines the positive/negative intention, and second one is that the positive/negative intention can be discriminated using a distance between the two peaks (negative: $T_N$, positive: $T_Y$) and a difference between relative minimum values of the two peaks.

Figure 3:
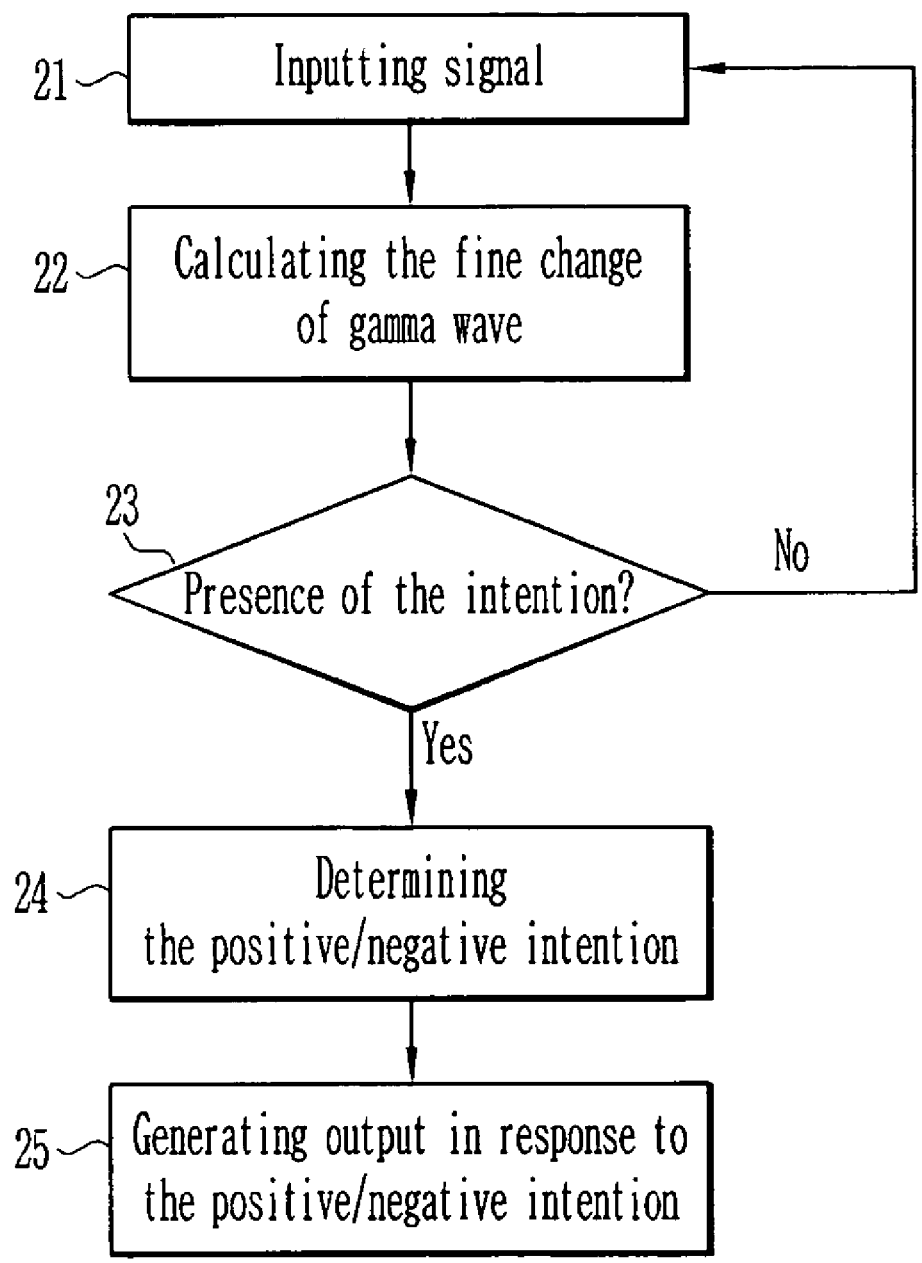
FIG. 3 shows a flow chart representing an operation flow in a recognizing portion and a control portion in accordance with a preferred embodiment of the present invention.

FIG. 3 shows a flow chart representing operation flows in the recognizing portion and the control portion in accordance with a preferred embodiment of the present invention.

In the first step 21, a brainwave signal of a digital type is inputted from the A/D converting portion 13 of FIG. 1.

In the second step 22, a fine change of gamma wave is calculated with respect to the brainwave signal of a predetermined time period (e.g., 0.1875 seconds). Typically, the gamma wave is one that has a brainwave component of 30 Hz or more, and is related to higher cognitive process of human being. In the present invention, the gamma wave band is set in the range of 32 Hz to 40 Hz, however, the range of the band can be adjusted in consideration of the brainwave property that is changed in accordance with a subject. The amount of fine change of gamma wave is used for extracting the fine change of frequency components included in the gamma wave band, which may be, for example, [P(36 Hz)−P(40 Hz)]/[P(36 Hz)+P(40 Hz)] or P(36 Hz)/[P(36 Hz)+P(40 Hz)]. In this case, P represents an output at a specific frequency, and the output may be obtained in a frequency domain by fourier transform or by band-pass filter. The present invention can also be applied to a method that one is skilled in the art can perform other than the above-mentioned fine change of gamma wave. The output change in each frequency within the gamma wave band is very fine, so that relative values between outputs rather than the output in each frequency may be effective for the positive/negative recognition.

In the third step 23, when there are no two peaks higher than a predetermined value, it is determined that there is no state related to the positive/negative intention, and a signal is continuously inputted from the A/D converting portion. When there are two peaks having values higher than the predetermined value, the process is progressed to the next step.

In the fourth step 24, the positive/negative intention is determined using property of the fine change of gamma wave. For example, when a distance between the two peaks is smaller than a predetermined threshold value $(T_N+T_Y)/2$, the positive intention is selected. By contrast, when the distance between the two peaks is larger than the predetermined threshold value $(T_N+T_Y)/2$, the negative intention is selected. The above-mentioned method for determining the positive/negative intention is only one example, and the present invention can be applied to a typical method that one skilled in the art performs (which is, for example, related to an adjustment of fine change of gamma wave using baseline or artificial neural network).

In the fifth step 25, activation commands are generated to a peripheral output device for an output in response to the determined intention when the positive/negative intention is determined.

As such, the fine change of gamma wave is calculated in the recognizer and the control portion to thereby determine the positive/negative intention. Alternatively, the fourth step 24 may be performed before the third step 23. Namely, after the positive/negative intention is determined, it may be determined whether the determined intention is valid or not. In addition, the first to fourth steps 21 to 24 are performed in the recognizer, and the fifth step 25 is performed in the control portion.

An apparatus and a method for recognizing a positive/negative intention using a fine change of gamma wave of a brainwave in accordance with the present invention have advantages that can deliver natural intention through the brainwave by recognizing the positive/negative intention without having specific brainwaves appeared with the aid of separate practice of the user, implement an application of a real time interface by utilizing the brainwave data of 0.5 seconds or less, and minimize inconvenience for the user when the user puts on the brainwave detector, by measuring the brainwave with one electrode positioned above a left frontal area of the brain.

In addition, the apparatus and the method for recognizing the positive/negative intention using the fine change of gamma wave of the brainwave in accordance with the present invention can be utilized as a basic component of "machine controlled by thinking" by recognizing the positive/negative intention, which is the basic intention of the human being, be applied to any machines capable of being operated by "Yes/No", and be employed to a welfare type interface for the handicapped not capable of using a keyboard or a mouse.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. An apparatus for recognizing positive/negative intention using a fine change of gamma wave of a brainwave, comprising:
    a brainwave detecting portion for detecting the brainwave from a head of a user;
    a brainwave amplifying portion for amplifying the brainwave detected from the brainwave detecting portion;
    an A/D converting portion for converting the amplified brainwave received from the brainwave amplifying portion to one of a digital type; and
    a recognizer for recognizing the positive/negative intention of the user by detecting the fine change of the gamma wave of the brainwave in the digital type, which is transmitted from the A/D converting portion;
    wherein the recognizer is configured to:
        receive the brainwave of the digital type;
        calculate the fine change of frequency components included in the gamma wave band from the brainwave of the digital type; and
        determine positive/negative and presence/absence of the intention in response to the fine change; and
    wherein the fine change of the frequency components is calculated to be [P(first frequency)−P(second frequency)]/[P(first frequency)+P(second frequency)] or P(first frequency)/[P(first frequency)+P(second frequency)], and the first and the second frequencies are ones of the gamma wave band.

2. The apparatus as claimed in claim 1, further comprising a control portion for generating control commands to a peripheral output device in response to the positive/negative intention recognized in the recognizer.

3. The apparatus as claimed in claim 2, wherein the brainwave detecting portion has an electrode that is adapted to be worn at a left frontal area of the user's head.

4. The apparatus as claimed in claim 2, wherein the brainwave detecting portion has an electrode that is adapted to be worn at a left frontal area of the user's head.

5. The apparatus as claimed in claim 1, wherein the brainwave detecting portion has an electrode that is adapted to be worn at a left frontal area of the user's head.

6. The apparatus as claimed in claim 1, further comprising a control portion for generating control commands to a peripheral output device in response to the positive/negative intention recognized in the recognizer.

7. The apparatus as claimed in claim 1, wherein the brainwave detecting portion has an electrode that is adapted to be worn at a left frontal area of the user's head.

8. A method for recognizing positive/negative intention using a fine change of gamma wave of a brainwave, comprising:
    a step of detecting a brainwave from a head of a user;
    a step of receiving and amplifying the brainwave detected from the step of detecting the brainwave;
    a step of converting the amplified analog brainwave to one of a digital type; and
    a step of recognizing the positive/negative intention of the user by detecting the fine change of the gamma wave of the brainwave in the digital type, which is transmitted from the A/D converting portion;
    wherein the recognition step includes:
        a step of receiving the brainwave of the digital type;
        a step of calculating the fine change of frequency components included in the gamma wave band from the brainwave of the digital type; and
        a step of determining positive/negative and presence/absence of the intention in response to the fine change; and
    wherein the fine change of the frequency components is calculated to be [P(first frequency)−P(second frequency)]/[P(first frequency)+P(second frequency)] or P(first frequency)/[P(first frequency)+P(second frequency)], and the first and the second frequencies are ones of the gamma wave band.

9. The method as claimed in claim 8, further comprising a step of controlling for generating control commands to a peripheral output device in response to the positive/negative intention recognized in the step of recognizing the positive/negative intention.

10. The method as claimed in claim 9, wherein the recognition of the positive/negative intention in the recognition step is performed such that the fine change of an output of each frequency within a gamma wave band is sensed.

11. The method as claimed in claim 10, wherein the gamma wave band is in the range of 32 Hz to 40 Hz.

12. The method as claimed in claim 9, wherein the recognition step includes:
    a step of receiving the brainwave of the digital type; a step of calculating the fine change of frequency components included in the gamma wave band from the brainwave of the digital type; and
    a step of determining positive/negative and presence/absence of the intention in response to the fine change.

13. The method as claimed in claim 8, wherein the recognition of the positive/negative intention in the recognition step is performed such that the fine change of an output of each frequency within a gamma wave band is sensed.

14. The method as claimed in claim 8 wherein the determination step includes:
    a step of determining that the intention is present when two peaks higher than a first predetermined threshold value are present, and that the intention is not present when the two peaks are not present; and
    a step of determining the positive/negative intention by comparing a second predetermined threshold value with a distance between the two peaks.

15. A method for recognizing positive/negative intention using a fine change of gamma wave of a brainwave, comprising:
- a step of detecting a brainwave from a head of a user;
- a step of receiving and amplifying the brainwave detected from the step of detecting the brainwave;
- a step of converting the amplified analog brainwave to one of a digital type; and
- a step of recognizing the positive/negative intention of the user by detecting the fine change of the gamma wave of the brainwave in the digital type, which is transmitted from the A/D converting portion;
- wherein the recognition step includes:
  - a step of receiving the brainwave of the digital type;
  - a step of calculating the fine change of frequency components included in the gamma wave band from the brainwave of the digital type; and
  - a step of determining positive/negative and presence/absence of the intention in response to the fine change; and
- wherein the determination step includes:
  - a step of determining that the intention is present when two peaks higher than a first predetermined threshold value are present, and that the intention is not present when the two peaks are not present; and
  - a step of determining the positive/negative intention by comparing a second predetermined threshold value with a distance between the two peaks.

16. The method as claimed in claim 15, further comprising a step of controlling for generating control commands to a peripheral output device in response to the positive/negative intention recognized in the step of recognizing the positive/negative intention.

17. The method as claimed in claim 16, wherein the recognition of the positive/negative intention in the recognition step is performed such that the fine change of an output of each frequency within a gamma wave band is sensed.

18. The method as claimed in claim 17, wherein the gamma wave band is in the range of 32 Hz to 40 Hz.

19. The method as claimed in claim 16, wherein the recognition step includes:
- a step of receiving the brainwave of the digital type; a step of calculating the fine change of frequency components included in the gamma wave band from the brainwave of the digital type; and
- a step of determining positive/negative and presence/absence of the intention in response to the fine change.

20. The method as claimed in claim 15, wherein the recognition of the positive/negative intention in the recognition step is performed such that the fine change of an output of each frequency within a gamma wave band is sensed.

21. The method as claimed in claim 15, wherein the fine change of the frequency components is calculated to be [P(first frequency)−P(second frequency)]/[P(first frequency)+P(second frequency)] or P(first frequency)/[P(first frequency)+P(second frequency)], and the first and the second frequencies are ones of the gamma wave band.

22. An apparatus for recognizing positive/negative intention using a fine change of gamma wave of a brainwave, comprising:
- a brainwave detecting portion for detecting the brainwave from a head of a user;
- a brainwave amplifying portion for amplifying the brainwave detected from the brainwave detecting portion;
- an A/D converting portion for converting the amplified brainwave received from the brainwave amplifying portion to one of a digital type; and
- a recognizer for recognizing the positive/negative intention of the user by detecting the fine change of the gamma wave of the brainwave in the digital type, which is transmitted from the ND converting portion;
- wherein the recognizer is configured to:
  - receive the brainwave of the digital type;
  - calculate the fine change of frequency components included in the gamma wave band from the brainwave of the digital type; and
  - determine positive/negative and presence/absence of the intention in response to the fine change; and
- wherein the determination includes:
  - determining that the intention is present when two peaks higher than a first predetermined threshold value are present, and that the intention is not present when the two peaks are not present; and
  - determining the positive/negative intention by comparing a second predetermined threshold value with a distance between the two peaks.

* * * * *